(12) United States Patent
Eckhardt et al.

(10) Patent No.: US 9,873,232 B2
(45) Date of Patent: Jan. 23, 2018

(54) APPARATUS FOR THE INTRODUCTION OF PRESSURIZED AIR AND/OR SEALANT INTO A TIRE

(71) Applicant: SUMITOMO RUBBER INDUSTRIES, LTD., Kobe-shi, Hyogo (JP)

(72) Inventors: Arnold Eckhardt, Ranstadt (DE); Klaus Lowitz, Reiskirchen (DE)

(73) Assignee: SUMITOMO RUBBER INDUSTRIES, LTD., Kobe-shi, Hyogo (JP)

( * ) Notice: Subject to any disclaimer, the term of this patent is extended or adjusted under 35 U.S.C. 154(b) by 0 days.

(21) Appl. No.: 15/036,094

(22) PCT Filed: Dec. 1, 2014

(86) PCT No.: PCT/JP2014/005989
§ 371 (c)(1),
(2) Date: May 12, 2016

(87) PCT Pub. No.: WO2015/083362
PCT Pub. Date: Jun. 11, 2015

(65) Prior Publication Data
US 2016/0271892 A1    Sep. 22, 2016

(30) Foreign Application Priority Data

Dec. 6, 2013  (DE) .......................... 10 2013 113 618

(51) Int. Cl.
*B29C 73/16* (2006.01)
*B60S 5/04* (2006.01)
*B29L 30/00* (2006.01)
(52) U.S. Cl.
CPC .............. *B29C 73/166* (2013.01); *B60S 5/04* (2013.01); *B29L 2030/00* (2013.01)

(58) Field of Classification Search
CPC ..................................................... B29C 73/166
(Continued)

(56) References Cited

U.S. PATENT DOCUMENTS

2009/0266440 A1* 10/2009 Lolli ..................... B29C 73/166
141/38
2010/0005930 A1*  1/2010 Lolli ..................... B29C 73/166
81/15.5

(Continued)

FOREIGN PATENT DOCUMENTS

EP    2261011 A1    12/2010

OTHER PUBLICATIONS

International Search Report, issued in PCT/JP2014/005989, PCT/ISA/210, dated Jun. 22, 2015.
(Continued)

*Primary Examiner* — Timothy L Maust
*Assistant Examiner* — Timothy P Kelly
(74) *Attorney, Agent, or Firm* — Birch, Stewart, Kolasch & Birch, LLP

(57) ABSTRACT

An apparatus (10) for the introduction of pressurized air and/or sealant into a tire comprising a source of pressurized air having an outlet (26), a container (14) containing the sealant which can be secured relative to a housing (12) of the source of pressurized air and which can be connected to the outlet of the source of pressurized air via an inlet (22), a hose (16) which is connected at a first end to an outlet of the container that is facing in an outlet direction and which has a second end that can be connected to the tire, wherein the housing of the source of pressurized air comprises a first vertical wall (30), with respect to which at least the outlet of the container is arranged laterally in a secured position and further comprises a second vertical wall (34) having means for guiding the hose and which is adjacent at least substan-
(Continued)

tially at a right angle to the first housing wall, wherein, in its position in which the container is secured at the housing, the outlet direction of the container extends in parallel to the first vertical wall and, in a storage state, the hose is guided in parallel to the first housing wall at least for a certain distance starting from the outlet of the container and in the direction toward the second vertical housing wall and then along the second vertical housing wall.

25 Claims, 10 Drawing Sheets

(58) Field of Classification Search
USPC .............................................. 141/38; 152/415
See application file for complete search history.

(56) References Cited

U.S. PATENT DOCUMENTS

| | | |
|---|---|---|
| 2010/0108185 A1 | 5/2010 | Chou |
| 2011/0126938 A1 | 6/2011 | Eckhardt |
| 2011/0180180 A1 | 7/2011 | Lolli et al. |
| 2013/0284313 A1 | 10/2013 | Kojima et al. |

OTHER PUBLICATIONS

Written Opinion of the International Searching Authority, issued in PCT/JP2014/005989, dated Jun. 22, 2015.

* cited by examiner

APPARATUS FOR THE INTRODUCTION OF PRESSURIZED AIR AND/OR SEALANT INTO A TIRE

TECHNICAL FIELD

The invention relates to an apparatus for the introduction of pressurized air/and or sealant into a tire according to the preamble of claim 1.

BACKGROUND ART

Such apparatus are generally known, for example, as tire repair systems, and comprise a source of pressurized air, for example an electric air pump or an air compressor, as well as a container containing sealant. Such tire repair systems are transported in a vehicle as a replacement for a spare wheel and generally comprise two modes of operation.

In order to increase the internal pressure of a tire, an outlet of the air compressor is directly connected to a tire valve via a hose, and the tire is inflated by the generated pressurized air.

In contrast to this, in the event of a tire failure, the inlet of the container is connected to the outlet of the compressor and the outlet of the container is connected to the tire valve via a hose. When the compressor is switched on, the sealant is conveyed into the damaged tire by the pressurized air. Subsequently, the tire is inflated by the compressor to a pressure sufficient for driving.

In order to enable a switching between the two modes of operation, the compressor and the container are configured such that they can be repeatedly connected and released by hand by the operator.

SUMMARY OF INVENTION

Technical Problem

In a state of non-use and respectively in a storage state of the apparatus, its components are generally stored in the trunk of the vehicle.

If the container and the compressor are stored in an already connected state, a simple installation and commissioning is brought about in the event of a tire failure. However, the connected components occupy a large amount of space in the trunk.

In contrast to this, if the compressor and the container are stored separately, the installation and commissioning is more time-consuming in the event of a tire failure.

For this reason, the invention is based on the object of providing an apparatus for the introduction of pressurized air and/or sealant into a tire that is as compact as possible and simple to operate.

Another object is to provide a safe securing of the container relative to the housing of the gas pressure source.

Solution to Problem

In order to satisfy the first object, an apparatus having the features of claim 1 is provided. The second object is achieved by an apparatus having the features of claim 19.

The apparatus in accordance with claim 1 comprises a source of pressurized air having an outlet, a container containing the sealant which can be secured relative to a housing of the source of pressurized air and which can be connected to the outlet of the source of pressurized air via an inlet, a hose which is connected at a first end to an outlet of the container that is facing in an outlet direction and which has a second end that can be connected to the tire, wherein the housing of the source of pressurized air comprises a first vertical wall, with respect to which at least the outlet of the container is laterally arranged in a secured position and further comprises a second vertical wall having means for guiding the hose, the second vertical wall being adjacent at least substantially at a right angle to the first housing wall, wherein in its position in which the container is secured at the housing, the outlet direction of the container extends in parallel to the first vertical wall and wherein, in a storage state, the hose is guided in parallel to the first housing wall at least for a certain distance starting from the outlet of the container and in the direction toward the second vertical housing wall and then along the second vertical housing wall.

In other words, a hose guide is provided which in the storage state of the apparatus initially guides the hose that is connected to the container away from the container outlet in the outlet direction, and thus in parallel to the first housing wall. Then, the hose is redirected and guided further in parallel to the second housing wall. The hose, which generally occupies a large amount of space, can be stored in a compact manner at the housing of the source of pressurized air due to the hose guide. The apparatus can therefore be stored in the connected state in a compact manner and can easily be installed and commissioned in the event of a tire failure.

Due to the fact that the hose is initially guided in the outlet direction of the container for a certain distance, this means in parallel to the first housing wall, and is only then guided along the second adjacent housing wall, a bending of the hose can be prevented. This is advantageous in so far as a bending of the hose can damage the hose and/or compromise the conveying of pressurized air and additionally sealant into the tire.

Advantageous embodiments of the claim 1 can be found in the dependent claims, the description, and the figures.

In particular, the hose guide can be configured such that it comprises a curvature that is oriented in parallel to the housing wall. When compared to a straight line extent, a curved hose guide provides more room for the reception of the hose. Furthermore, a tension in the hose during storage can be reduced by the curvature.

In accordance with an embodiment of the invention, the hose guide opens into a hose compartment for receiving the hose. For example, a hollow space in which the hose can be at least partially received in the storage state of the apparatus can serve as a hose compartment. In this way, the hose can be stowed away in a compact manner despite having a large total length.

In particular, the hose compartment can be arranged at a third vertical wall of the housing, the third vertical wall adjoining the second housing wall at least substantially at a right angle and lying opposite the first wall. In accordance with this arrangement, the first, the second and the third housing walls serve for the reception of the hose, whereby a particularly large storage space for the hose is created.

In accordance with a further embodiment, the hose guide comprises a hose attachment for holding the hose and which prevents the hose from unwinding in the storage state. The hose attachment can be arranged, for example, at the second housing wall and/or between the hose guide and the hose.

Furthermore, the hose attachment can comprise a clamping mechanism for clamping the hose, the clamping mechanism gripping around the outer circumference of the hose.

The clamping mechanism reliably secures the hose, releases the hose without requiring the use of considerable force and can be easily manufactured.

In order to enable the proper and compact reception of the hose in a space saving manner, the hose attachment can comprise a passage extending along at least one housing wall. In this way, a secure and compact storage can be ensured. Furthermore, the hose is protected from damage in this way.

The passage preferably comprises two passage walls that are arranged in parallel to one another with a distance between the passage walls being smaller than an outer diameter of the hose. As a result, a clamping effect is brought about between the passage walls and an outer circumference of the hose for securely holding the hose.

Alternatively or additionally, a depth of the passage can correspond at least substantially to an outer diameter of the hose such that the hose is fully received in the passage. A particularly protected storage of the hose is enabled in this way.

The housing preferable comprises a base and an upper part that together define a seat for the container in a use state of the apparatus. When the apparatus is used, the container is supported on the ground from below by the base. The container is laterally supported by the upper part of the housing.

In accordance with a further embodiment, the inlet and the outlet of the container are arranged at least substantially at a right angle with respect to one another. In this way, in the storage state of the apparatus, the hose can be guided at a small radius of curvature into the hose guide and/or directly to the tire valve in the state of use of the apparatus.

In order to enable a simple and cost effective manufacture of the container, the container can further comprise an extraction unit in which the inlet and the outlet of the container are formed. In this connection, the extraction unit can be formed, for example, as a plastic injection molded part. A simple plastic bottle can serve as a container.

The inlet of the container can preferably be directly connected to the outlet of the source of pressurized air. This leads to a simplification of assembly and reduction in weight.

In accordance with a further embodiment, the container can be connected to the source of pressurized air in a particularly reliable and simple manner if the connection between the container inlet and the outlet of the source of pressurized air comprises a plug connection. In particular, the connection between the container inlet and the outlet of the source of pressurized air comprises a locking device that is preferably formed at an extraction unit that is connected to the container, in particular releasably connected to the container. An accidental decoupling of the container is hereby prevented.

The housing preferably comprises a cable compartment for properly receiving a supply cable at a third vertical wall that is adjacent to the second housing wall at least substantially at a right angle and that lies opposite the first wall.

A particularly ergonomic design of the apparatus is achieved due to the fact that the housing comprises a switch for switching the apparatus on and off at a fourth vertical wall that lies opposite the second housing wall.

In accordance with a particularly clear embodiment, the housing comprises a top side at which a manometer is arranged. The manometer can thus be read particularly easily during use.

An advantage of the apparatus of claim 19 is that the container is safely secured relative to the housing. For example when the apparatus is dropped accidentally by the user or when it experiences similar interference the container is prevented from being displaced from its secured position relative to the housing, i.e. the container is prevented from falling off. Thereby the functioning of the apparatus is maintained, because the plug connection between the inlet of the container and the outlet of the source of pressurized air remains connected. The holder provides for a simple and cost-efficient additional securing of the container, by supporting the container from below.

In accordance with an embodiment of the invention the holder vertically supports the container at a rounded lower end of the container. The lower end may be a tube socket defining the outlet of the container. Thereby the flow of liquid sealant can be optimized, because the flow is facilitated by gravity.

In accordance with a further embodiment of the invention the holder positively locks the lower end of the container in its position secured relative to the housing. This provides for a safe securing of the container.

In accordance with another embodiment of the invention the holder at least partly consists of an elastic material, in particular an elastomer.

Examples of elastic materials in accordance with the embodiment are rubber and silicone-based elastomers. The holder may also be displaceable against an elastic element.

The restoring force affiliated with the elasticity improves the securing of the container relative to the housing. Also, a double-fit and an overdetermination of the mechanical system is prevented. This, in turn, makes the container easier to secure relative to the housing.

In accordance with still another embodiment of the invention the holder comprises at least on its surface, which faces the lower end of the container, a material that provides high friction between the holder and the lower end of the container. Therefore, more force is necessary to displace the lower end of the container relative to the holder. A motion of the lower end of the container in a direction parallel to the surface of the holder is prevented and the container is secured more safely relative to the housing. Especially in case of a positive locking, high friction between the holder and the lower end of the container advantageously cooperates with the positive locking to provide a simple to manufacture but effective support.

In accordance with an embodiment the holder provides a snap-fit connection between the holder and the lower end of the container, such that the lower end of the container is arranged in a recess when the snap-fit connection is engaged and when the container is secured relative to the housing. Thereby, the securing motion, which takes place during securing of the container relative to the housing, is used to engage the holder at the same time, i.e. no extra motion is necessary to be performed by the user.

In accordance with a further embodiment of the invention the holder comprises at least one protrusion to engage with the lower end of the container such that the protrusion is elastically displaced by the lower end of the container when the inlet of the container is plugged to the outlet of the source of pressurized air.

In accordance with an embodiment the holder is arranged in a depression of the housing. The depression may be positioned on a top side of a base defining a seat for the container together with an upper part of the housing.

The holder may be an integral part of the housing or a separate part.

DESCRIPTION OF EMBODIMENTS

Figure 1:
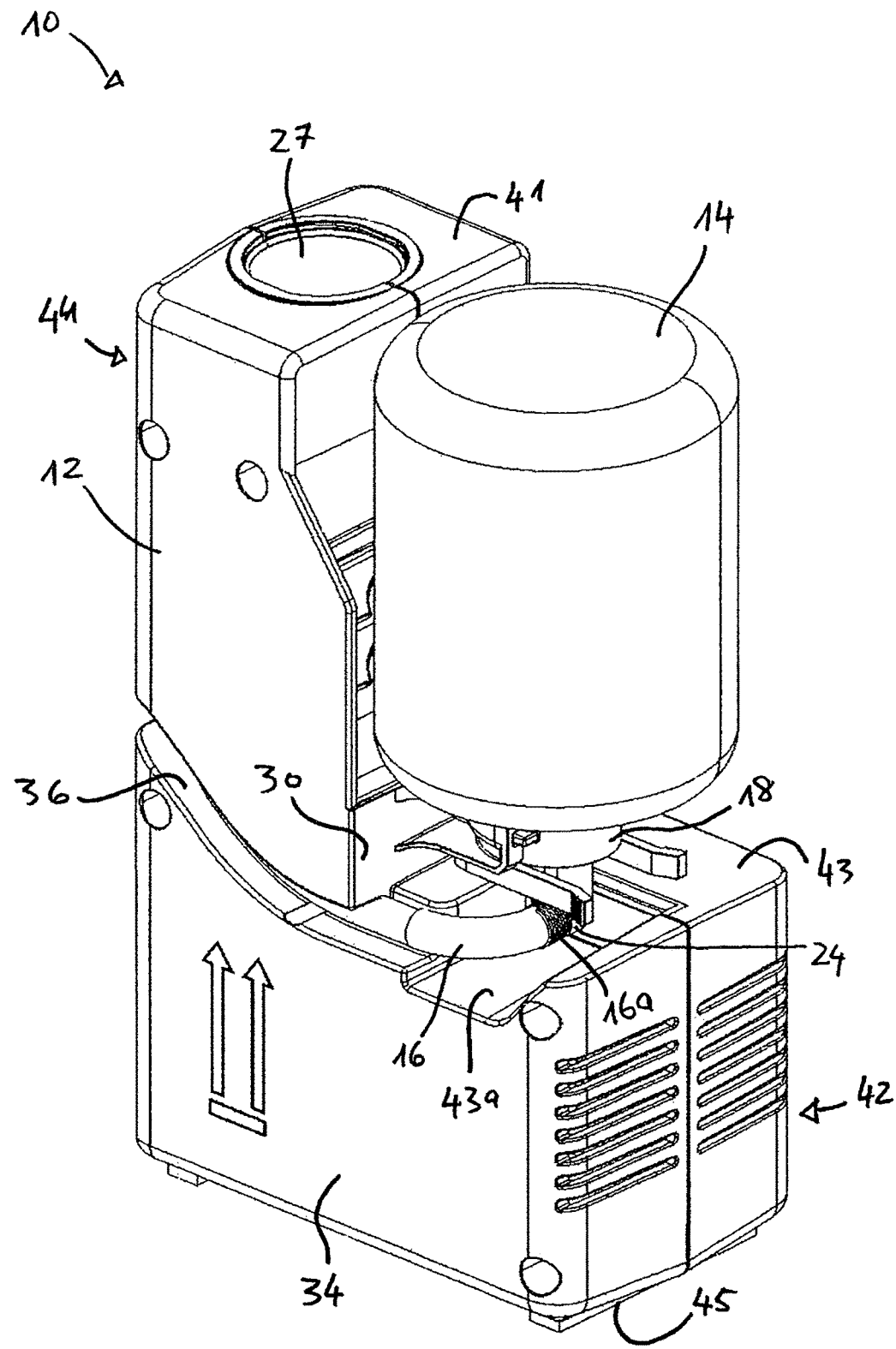
FIG. 1 a perspective view of an apparatus for the introduction of air and/or sealant into a tire in accordance with the invention.

The invention is described in the following by means of an embodiment with reference to the drawing.

FIG. 1 shows an apparatus 10 in accordance with the invention in a storage state in which the apparatus 10 can, for example, be stowed away in the trunk of a vehicle. The apparatus 10 comprises a housing 12 having a source of pressurized air that is received in the housing and is not shown in the drawing, a container 14 containing sealant, and a hose 16. The source of pressurized air can comprise a compressor for pressurizing ambient air and an electric motor to drive the compressor, which are likewise not shown in the drawings. By means of a non-illustrated electric supply cable, the source of pressurized air can be supplied with electric power, for example from a cigarette lighter of a vehicle.

Figure 5:
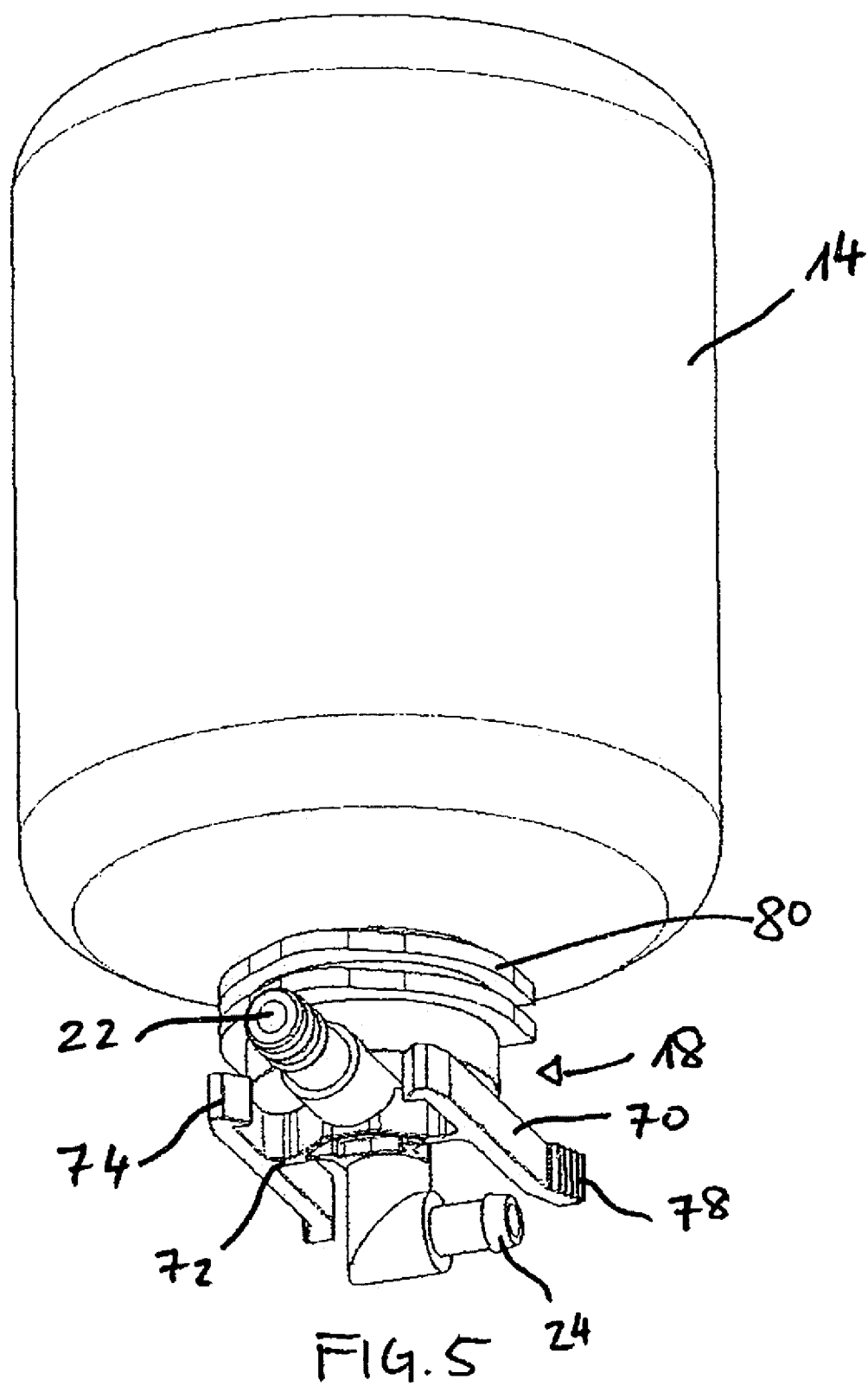
FIG. 5 a perspective view of a container of the apparatus in accordance with FIGS. 1 and 2.
Figure 6:
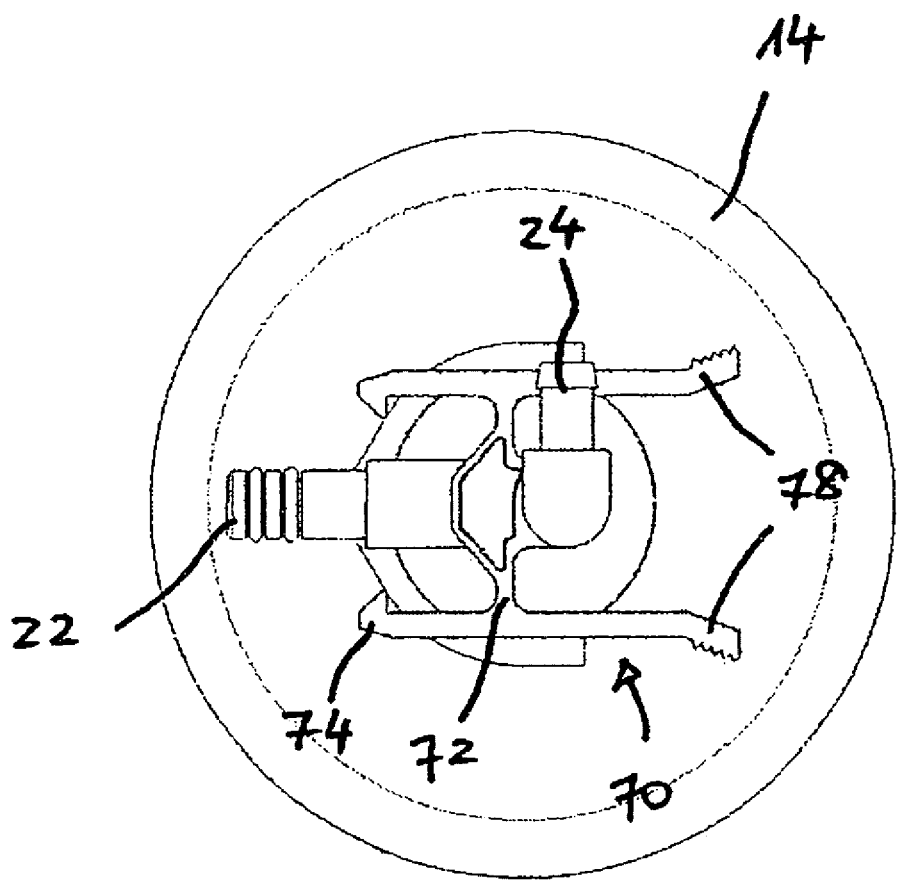
FIG. 6 a bottom view of the container in accordance with FIG. 5.

The container 14 opens into an extraction unit 18 via a container opening, the extraction unit forming a container inlet 22 and a container outlet 24 (cf. FIGS. 5 and 6). The container 14 is coupled to an outlet 26 of the compressor (cf. FIG. 3) via the container inlet 22 such that the pressurized air generated by the compressor can flow into the container 14. The container outlet 24, which is separate from the container inlet 22, is connected to the hose 16 and serves the purpose of conveying sealant and then pressurized air into a tire to be repaired via the hose 16. In accordance with an alternative configuration that is not shown, the hose 16 is connected directly at the outlet 26 of the source of pressurized air, so that pressurized air can flow into a tire to be filled, which itself is intact, or the filling level of the tire can be checked using a manometer 27 arranged at the housing 12 without the addition of sealant.

The hose 16 comprises an inlet end 16a, which is connected to the container inlet 22, as well as an outlet end that is not shown and which comprises a suitable connecting piece for the connecting of the hose 16 to a tire valve, for example a so-called VG8 screw connection.

The housing 12 comprises a first vertical wall 30, with respect to which the outlet 24 of the container 14 is laterally arranged. Specifically, an outlet direction of the container outlet 24 is arranged in parallel to the first housing wall 30.

It therefore follows that the hose 16, which connects to the container outlet 24 via the inlet end 16a, is guided initially for a certain distance in parallel to the first housing wall 30. Furthermore, the housing 12 comprises a second vertical wall 34 that is adjacent at a right angle to the first housing wall 30. The second housing wall 34 comprises a passage 36 that forms a hose guide and guides the hose 16 away from the container outlet 24. By virtue of the passage 36, the container 14 and the hose 16 form a compact unit with the housing 12 that is able to be stored in a space-saving manner and ready for use.

In order to switch from the storage state to the state of use, the hose 16 is initially removed from the passage 36 and is then connected to the tire valve via the outlet end, which is not shown. Next, the supply cable is connected to the cigarette lighter of the vehicle and an on and off switch 38 is actuated (see FIG. 2). Then, pressurized air is generated by the compressor and flows into the container 14 via the container inlet 22 and conveys sealant out of the container outlet 24 into the tire via the hose 16. The damaged tire is sealed by the sealant and after the emptying of the container 14, pressurized air is pumped into the tire to increase the internal pressure of the tire.

Figure 2:
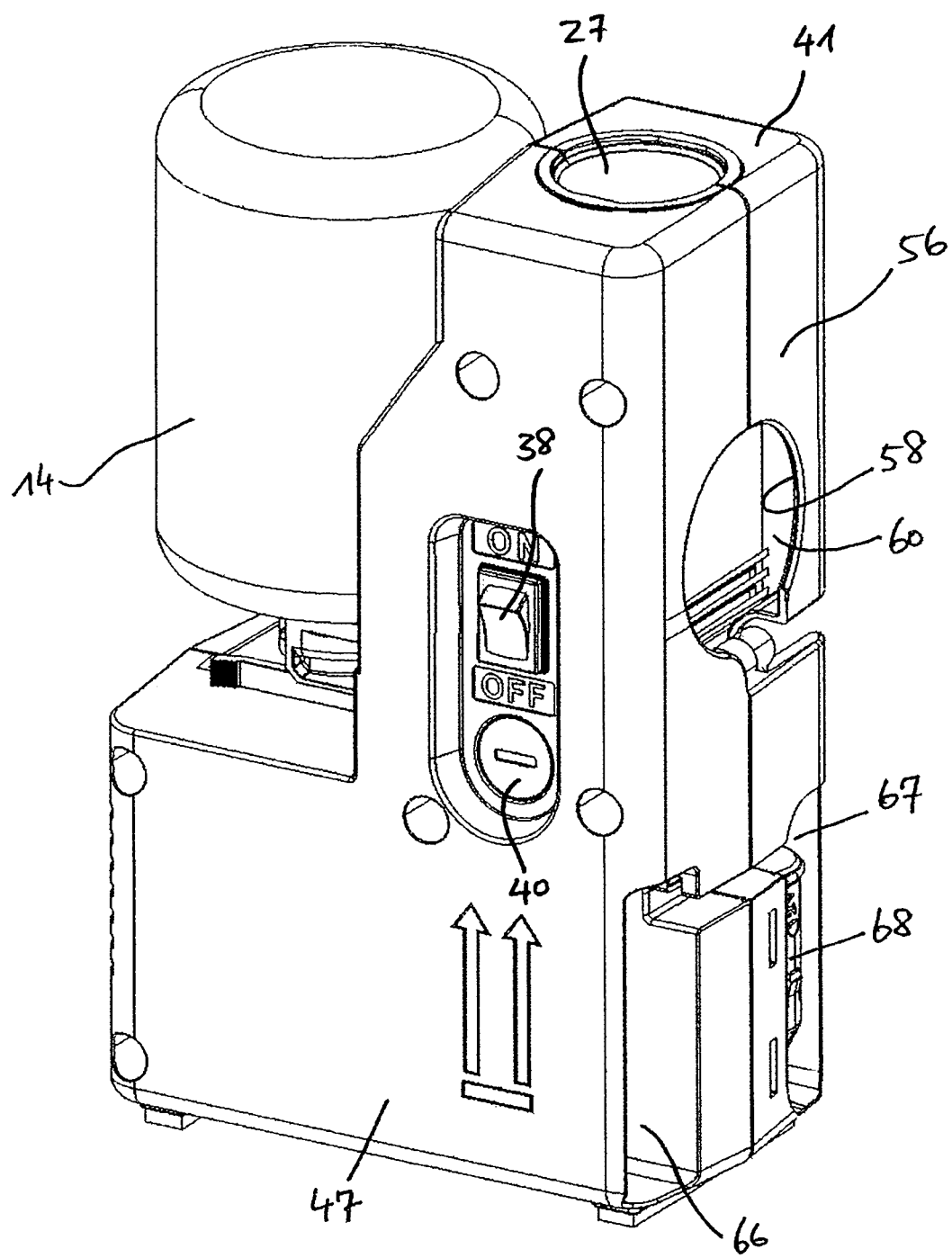
FIG. 2 a further perspective view of the apparatus in accordance with FIG. 1.

The on and off switch 38 and a pressure release button 40 that are laterally arranged for the purpose of ergonomic operation at a fourth vertical wall 47 of the housing 12 that lies opposite the second vertical wall 34 can be recognized in the further perspective view of the apparatus 10 in accordance with FIG. 2. The housing 12 is further equipped with a manometer 27 at a top housing side 41 for displaying the air pressure generated by the compressor. The manometer 27 can be easily read during use by the user due to this arrangement.

In the state of use of the apparatus 10, the container 14 is held by the housing 12 on its head in a vertical position of use. For this purpose, the housing 12 comprises a base 42 and an upper part 44 that together define a seat for the container 14 in the state of use of the apparatus 10.

Figure 3:
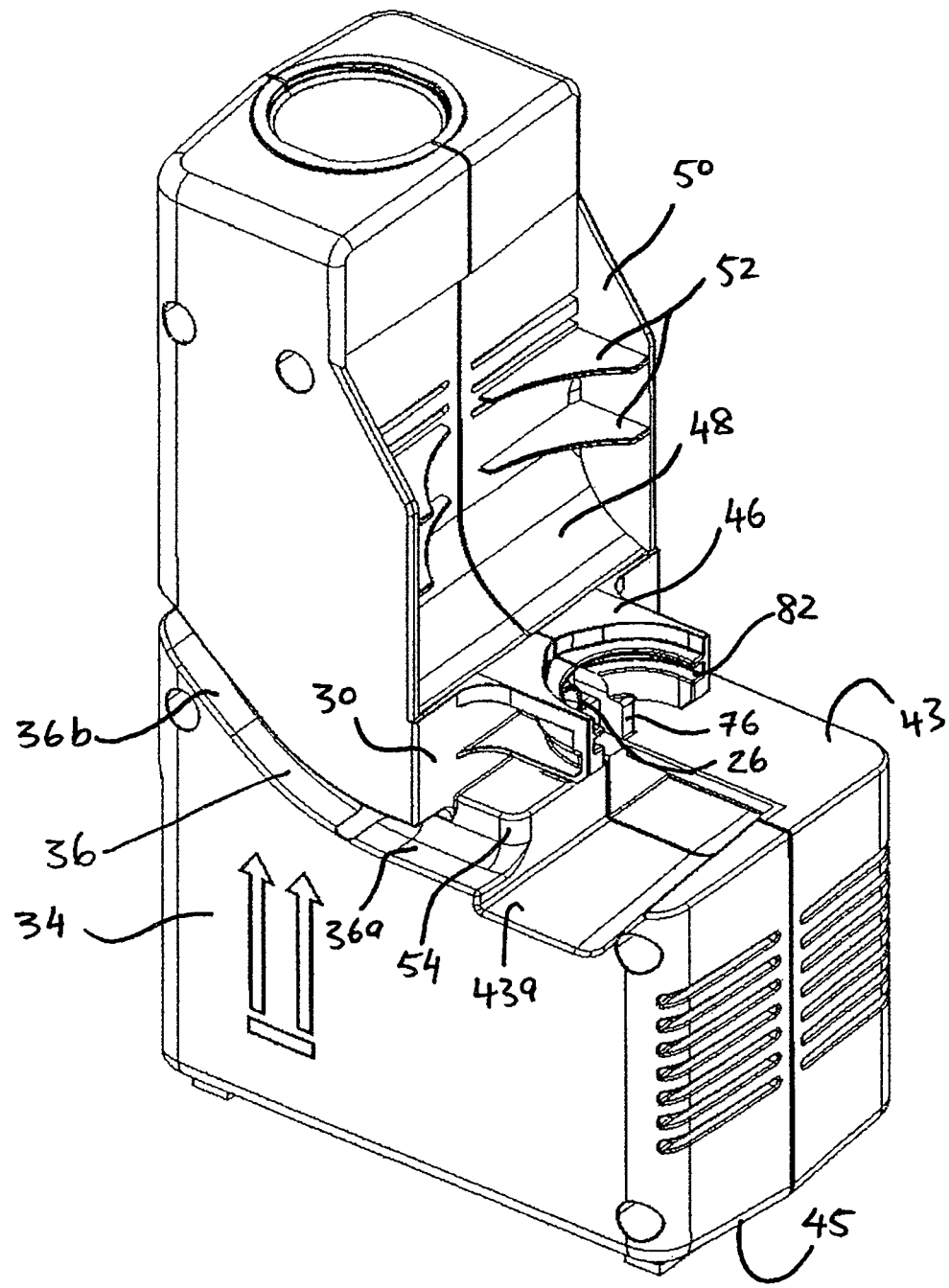
FIG. 3 a perspective view of the housing in which a source of pressurized air of the apparatus in accordance with FIG. 1 is accommodated.
Figure 4:
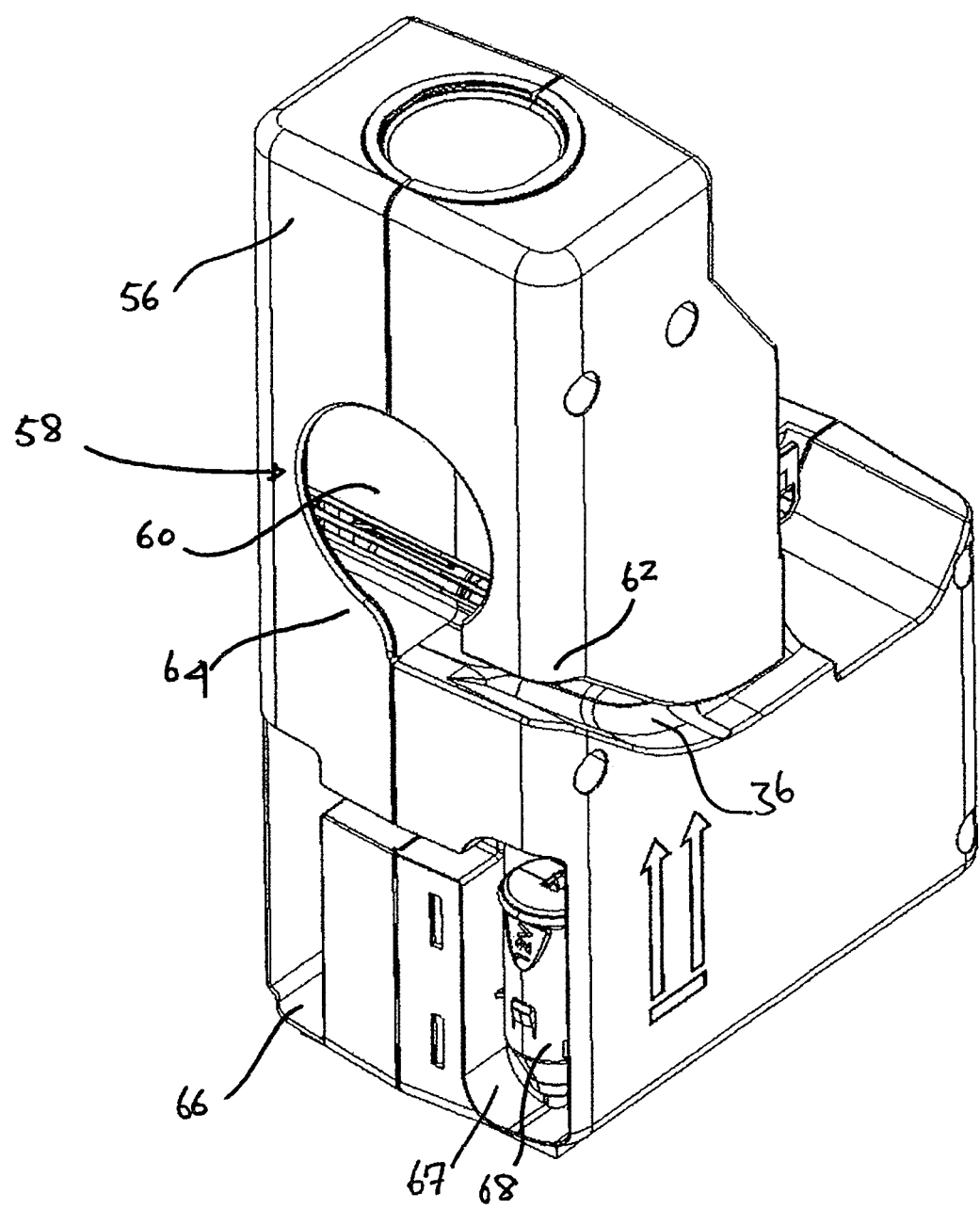
FIG. 4 a further perspective view of the housing in accordance with FIG. 3.

In FIGS. 3 and 4, the housing 12 is illustrated with the compressor and without the container 14 or the hose 16, whereby the base 42 and the upper part 44 can clearly be seen. The base 42 is partly formed by the second housing wall 34 as well as a housing bottom 45. In the state of use of the apparatus 10, the base 42 and thus the housing 12 stands on the ground and forms a base for the container 14 (cf. FIGS. 1 and 2). The base 42 is formed in an approximately square or rectangular shape, wherein a further shape that is suitable for the reception of the source of air, for example a flattened cylinder, would also be possible. The base 42 further comprises a base top side lying opposite the housing bottom 45 and at which a depression 43a for the reception of the extraction unit 18 and of the hose 16 is arranged (cf. FIG. 1).

The upper part 44 of the housing 12 is arranged above the base 42 and comprises the first housing wall 30. The previously mentioned outlet 26 of the air compressor is arranged at the first housing wall 30, with the outlet being able to be releasably coupled with the container inlet 22. The first housing wall 30 is provided with a coupling section 46 for the coupling of the container 14, with the coupling section projecting perpendicularly from the first housing wall 30 and cooperating with the extraction unit 18. The functional principle of the coupling section 46 is described in more detail below by means of FIGS. 5 and 6.

At an end remote from the base 42, the upper part 44 comprises a curved side wall 48 that is adapted to an outer contour of the container 14 (cf. FIG. 5). The upper part 44 comprises wing sections 50 to the left and to the right of the curved side wall 48, respectively. The wing sections 50 are connected to the curved housing wall 48 by a plurality of thin supporting fins 52. The supporting fins 52 are formed in mirror image to the shape of the jacket surface of the container 14 (cf. FIG. 5). A movement in a direction in parallel to the first housing wall 30 of the container 14 that is coupled to the housing 12 is prevented by the wing sections 50 and the supporting fins 52. The container 14 is thus stabilized in the state of use by the upper part 44 of the housing 12.

FIG. 3 also shows the passage 36 for the guiding of the hose 16. Starting from an outlet direction that is perpendicular to the outlet 26 of the source of pressurized air, the inlet end 16a of the hose 16 is received in the depression 43a of the top side 43 of the base (cf. FIG. 1). The inlet end 16a is oriented in parallel to the first housing wall 30 and extends up to a rounded edge 54, which joins the first housing wall 30 and the second housing wall 34 and enables a turning of the hose 16 without a bending of the hose 16.

The passage 36 connects to the edge 54 at a first section 36a that extends approximately in parallel to the housing bottom 45. The passage 36 comprises a curvature in that a second section 36b of the passage extends upwards and away from the housing bottom 45. Due to the curvature, the length of the passage 36 increases in comparison to a straight passage, whereby a longer length is given for receiving the hose 16. Alternatively, the second section 36b can face in the direction of the housing bottom.

As can be seen in FIG. 1, the width of the passage 36 is dimensioned such that the hose 16 lies in the passage 36 with a minimum clearance, and is securely held by the passage 36 in this way. The depth of the passage 36 is selected such that the hose 16 can be completely lowered into the passage 36.

FIG. 4 shows a further perspective view of the apparatus 10, in which a third vertical housing wall 56 that is adjacent at a right angle to the second housing wall 34 can be seen. The third housing wall 56 comprises a hose compartment 58 for the reception of the outlet end of the hose 16. The hose compartment 58 comprises a hollow space 60 into which the passage 36 opens. A clamping section 62 that prevents the hose 16 from unwinding in the storage state is arranged between the hollow space 60 and the passage 36. In comparison to the passage 36, the clamping section 62 comprises a narrower width such that the hose 16 cannot leave the clamping section 62 by itself. In order to secure the hose 16 in the hollow space 60, the third housing wall 56 comprises an undercut 64, wherein the undercut 64 could also be replaced, for example, by a closeable flap. The third housing wall 56 further comprises a cable compartment 66 for the reception of the supply cable and a compartment 67 for the reception of the plug 68.

The container 14 will now be explained in more detail by means of FIG. 5 and FIG. 6. As can be seen in FIG. 5 a container neck of the container 14 opens into the extraction unit 18. In order to facilitate a complete emptying of the container 14 on a removal of the sealant, the extraction unit 18 is screwed onto the end of the container 14 that is located at the bottom when the container is oriented on its head in the state of use. The extraction unit forms the container inlet 22 and the container outlet 24, which is arranged displaced by 90 degrees to the container inlet 22.

In order to switch between the operational modes of the apparatus 10 and/or in order to exchange a container 14, the extraction unit 18 is configured such that it can be repeatedly connected and released from the air compressor by hand by the user. In order to connect the container 14 to the air compressor, a guiding fin 80 that is formed at the extraction unit is first guided into a guiding groove 82 of the coupling section 46. Then, the container inlet 22 is plugged into the outlet 26 of the source of pressurized air. In order to prevent an accidental decoupling of the container inlet 22, the extraction unit 18 is equipped with a locking mechanism that comprises two locking levers 70, which can be actuated.

The locking levers 70 are arranged respectively laterally to the container inlet 22 and are connected to the extraction unit 18 at a centrally arranged pivot point 72. At a first end facing the container inlet 22, each of the locking levers 70 comprises a snap hook 74, which each cooperate with a coupling hook 76 of the coupling section 46 (cf. FIG. 3). In order to release the snap hooks 74 from the coupling hooks 76, the free ends 78 of the locking levers 70 are pressed together.

FIGS. 7 to 10 show an apparatus according to the invention. A container 14 is secured relative to a housing 12. The apparatus comprises a base 42 with a top side 43 defining a depression 43a. In the depression 43a a holder 84 is arranged, to support the container from below.

The container 14 comprises at its lower end an extraction unit 18, with which the container 14 is connected. The container 14 comprises an inlet 22 and an outlet 24 both being formed as part of the extraction unit 18. Opposite the inlet 22 of the container 14 an outlet 26 of a source of pressurized air is situated. The inlet 22 of the container 14 and the outlet 26 of the source of pressurized air together form a plug connection, such that both are plugged by a motion along a horizontal axis. The horizontal axis of the plug connection is concentric to a cylindrical shape of the inlet 22 and of the outlet 26, respectively.

The holder 84 supports the container 14 from below at the container's lower end which is formed by the extraction unit 18. The lower end is defined by an outlet 24 of the container 14. The outlet 24 of the container 14 is a tube socket, i.e. it has a rounded, cylindrical shape. That rounded lower end of the container 14, i.e. the tube socket, rests in a recess 86 of the holder 84, while it is retained in its horizontal position by means of a protrusion 88 and a corresponding protrusion on the opposite side of the holder 84. The holder 84 is at least on its surface made of rubber, which is elastic and provides high friction between the holder 84 and the tube socket. When plugging inlet 22 of the container 14 into outlet 26 of the source of pressurized air, the tube socket of the outlet 24 moves horizontally, i.e. in FIG. 8 it moves to the left in the drawing into the depicted position. Thereby the tube socket overcomes the elastic protrusion 88 to reach the securing position as shown. In other words the tube socket snaps over protrusion 88. i.e. the tube socket and the holder form a snap-fit connection.

Figure 9:
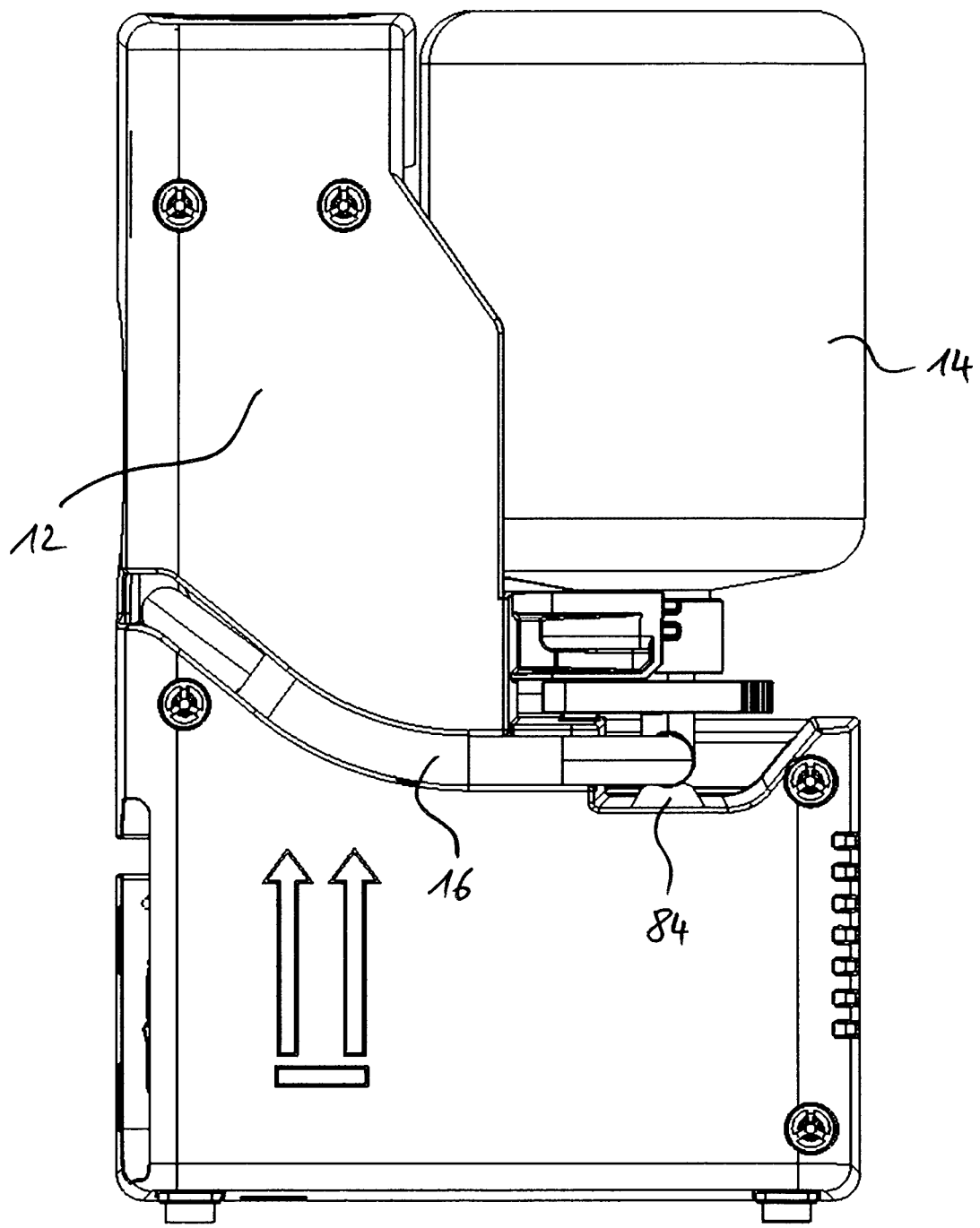
FIG. 9 a side view of that apparatus.
Figure 10:
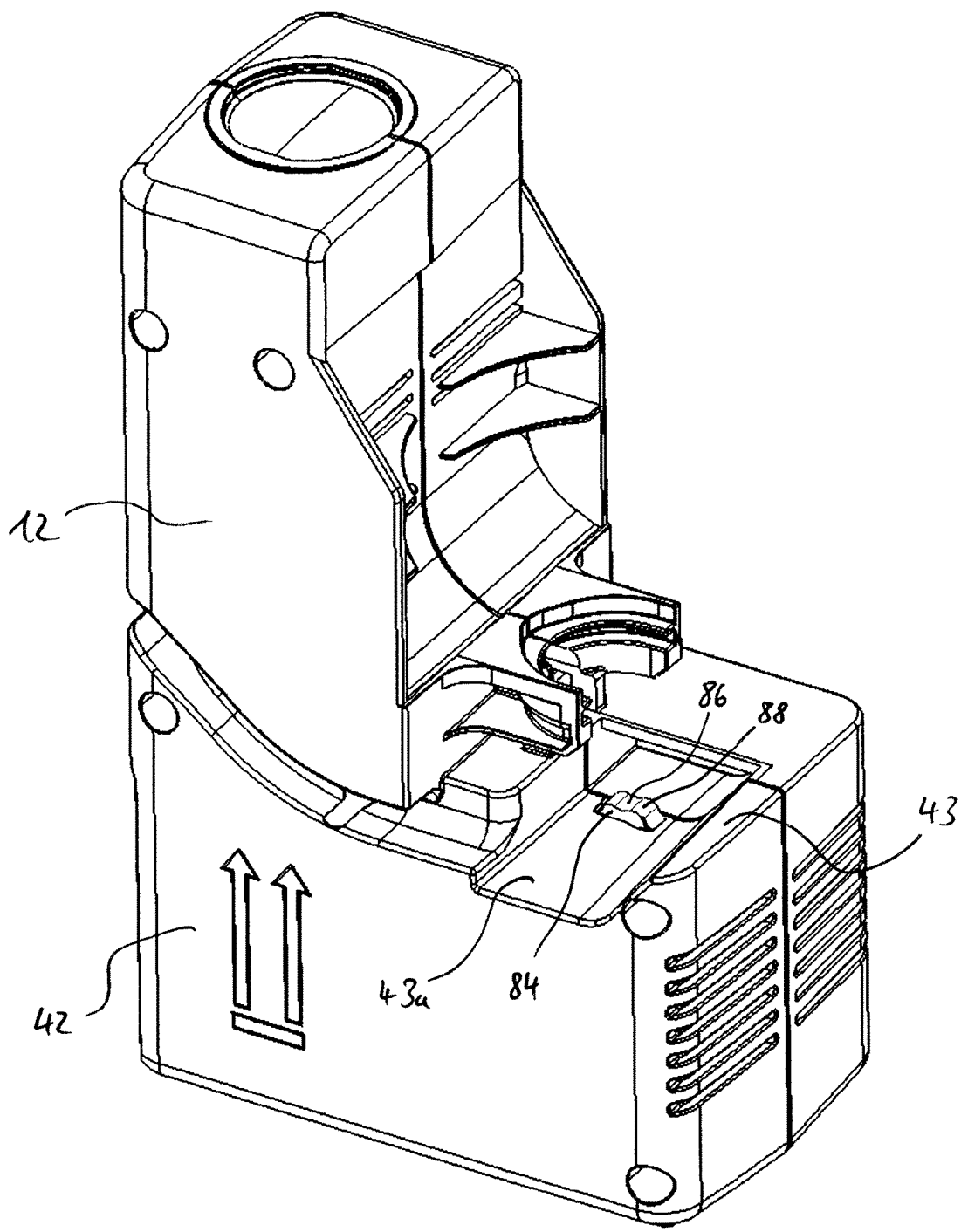
FIG. 10 another perspective view of that apparatus, wherein some parts have been omitted to better show the other parts.

FIG. 9 shows the whole apparatus in a side view. The container 14 is secured relative to the housing 12. The holder 84 supports the container 14 from below, thereby forming a support for the container 14 against vertical downward motion and at the same time preventing horizontal motion of the container 14 at its lower end. The holder secures the container 14 relative to the housing 12 safely, e.g. it prevents the container 14 from falling off in case of disturbances. The hose 16 is connected to the tube socket (hidden behind the hose 16 in FIG. 9) close to the holder 84.

Figure 7:
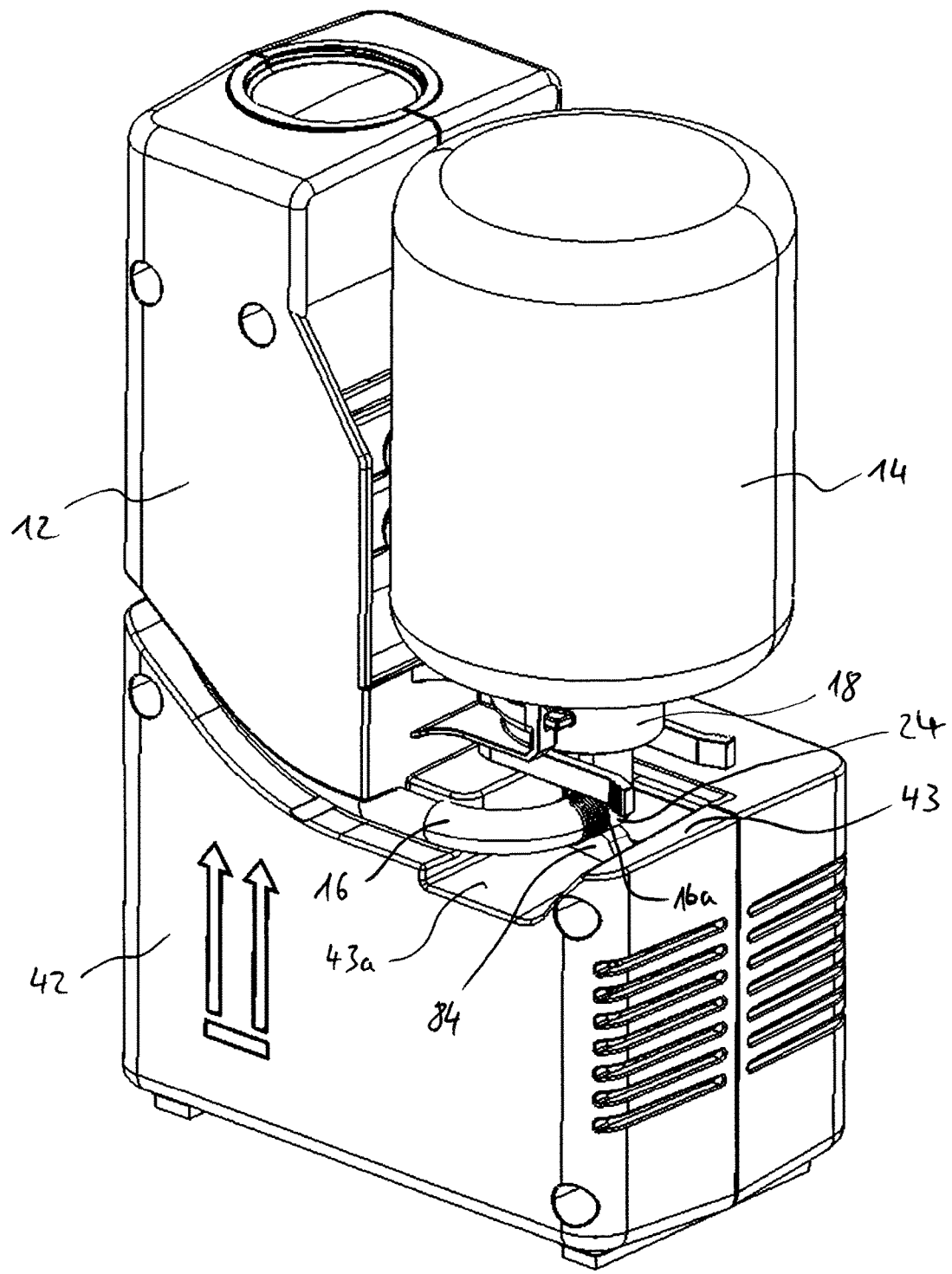
FIG. 7 a perspective view of an apparatus for the introduction of air and/or sealant into a tire in accordance with the invention.
Figure 8:
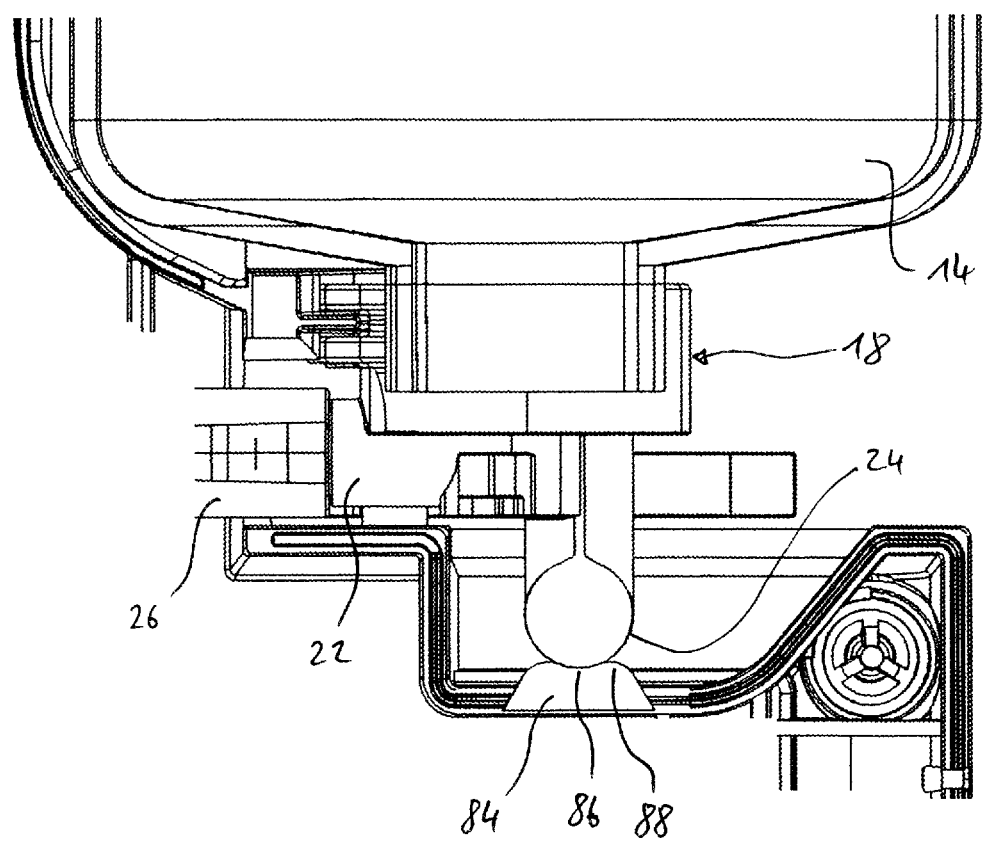
FIG. 8 a sectional view of the apparatus of FIG. 7.

FIG. 7 shows a perspective view of the apparatus. The container 14 is secured relative to the housing 12 via the extraction unit 18. In the depression 43a of the base 42 the holder 84 is visible. Close to the holder 84 the hose 16 is connected to the outlet 24 of the container 14 at an inlet end 16a of the hose 16. The connection between the outlet 24 and the inlet end 16*a* defines an outlet connection axis, concentric to the tube socket of outlet 24. The outlet connection axis is perpendicular to the connection axis of the plug connection between outlet 26 of the source of pressurized air and inlet 22 of the container and it is also horizontally arranged. With respect to the vertical axis the connection axis is arranged below the connection axis of the plug connection. The holder 84 is positively locking the lower end of the container 14 against motion parallel to the connection axis of the plug connection between the inlet 22 of the container 14 and the outlet 26 of the source of pressurized air (not shown in FIG. 7).

REFERENCE SIGNS LIST

- 10 apparatus
- 12 housing
- 14 container
- 16 hose
- 16*a* inlet end of the hose
- 18 extraction unit
- 22 container inlet
- 24 container outlet
- 26 outlet of the source of pressurized air
- 27 manometer
- 30 first housing wall
- 34 second housing wall
- 36 passage
- 36*a*, *b* passage sections
- 38 on and off switch
- 40 pressure release button
- 41 top housing side
- 42 base
- 43 top side of the base
- 43*a* depression
- 44 upper housing part
- 45 housing bottom
- 46 coupling section
- 47 fourth vertical housing wall
- 48 side wall
- 50 wing section
- 52 supporting fins
- 54 edge
- 56 third vertical housing wall
- 58 hose compartment
- 60 hollow space
- 62 clamping section
- 64 undercut
- 66 cable compartment
- 67 plug compartment
- 68 plug
- 70 locking lever
- 72 pivot point
- 74 snap hook
- 76 coupling hook
- 78 free end
- 80 guiding fin
- 82 guiding groove
- 84 holder
- 86 recess
- 88 protrusion

The invention claimed is:

1. An apparatus for the introduction of pressurized air and/or sealant into a tire comprising:
a source of pressurized air having an outlet,
a container containing the sealant which can be secured relative to an outside a housing of the source of pressurized air and which can be connected to the outlet of the source of pressurized air via an inlet,
a hose which is connected at a first end to an outlet of the container that is facing in an outlet direction and which has a second end that can be connected to the tire,
wherein the housing of the source of pressurized air comprises a first vertical housing wall, with respect to which at least the outlet of the container is laterally arranged in a secured position and further comprises a second vertical housing wall having a hose guide, the second vertical housing wall being adjacent at least substantially at a right angle to the first vertical housing wall,
wherein in its position in which the container is secured at the housing, the outlet direction of the container extends in parallel to the first vertical housing wall and in that, in a storage state, the hose is positioned in parallel to the first vertical housing wall at least for a certain distance starting from the outlet of the container and in the direction toward the second vertical housing wall and then along the second vertical housing wall, and
the housing comprises a base and an upper part that together define a seat for the container, the seat being exposed to the outside of the housing and disposed on a part of a top surface of the base on which the upper part is not provided.

2. An apparatus in accordance with claim 1, wherein the hose guide comprises a curvature that is oriented in parallel to the second vertical housing wall.

3. An apparatus in accordance with claim 1, wherein the hose guide opens into a hose compartment for receiving the hose.

4. An apparatus in accordance with claim 3, wherein the hose compartment is arranged at a third vertical housing wall of the housing, the third vertical housing wall adjoining the second vertical housing wall at least substantially at a right angle and lying opposite the first vertical housing wall.

5. An apparatus in accordance with claim 1, wherein the hose guide comprises a hose attachment.

6. An apparatus in accordance with claim 5, wherein the hose attachment comprises a clamping mechanism for clamping the hose.

7. An apparatus in accordance with claim 5, wherein the hose attachment comprises a passage extending along at least one of the first vertical housing wall, the second vertical housing wall and the third vertical housing wall.

8. An apparatus in accordance with claim 7, wherein the passage comprises two passage walls that are arranged in parallel to one another, with a distance between the passage walls being smaller than an outer diameter of the hose.

9. An apparatus in accordance with claim 1, wherein the inlet and the outlet of the container are arranged at least substantially at a right angle with respect to one another.

10. An apparatus in accordance with claim 1, wherein the container comprises an extraction unit in which the inlet and the outlet of the container are formed.

11. An apparatus in accordance with claim 1, wherein the inlet of the container can be directly connected to the outlet of the source of pressurized air.

12. An apparatus in accordance with claim 11, wherein the connection between the container inlet and the outlet of the source of pressurized air comprises a plug connection.

13. An apparatus in accordance with claim 11, wherein the connection between the inlet of the container and the outlet of the source of pressurized air comprises a locking device that is formed at an extraction unit, which is connected to the container.

14. An apparatus in accordance with claim 1, wherein the housing comprises a cable compartment for receiving a supply cable at a third vertical housing wall that is adjacent to the second vertical housing wall at least substantially at a right angle and that lies opposite the first vertical housing wall.

15. An apparatus in accordance with claim 1, wherein the housing comprises a switch for switching the apparatus on and off at a fourth vertical housing wall that lies opposite the second vertical housing wall.

16. An apparatus in accordance with claim 1, wherein the housing comprises a top side at which a manometer is arranged.

17. An apparatus for the introduction of pressurized air and/or sealant into a tire having
   a source of pressurized air having an outlet,
   a container containing the sealant which can be secured relative to a housing of the source of pressurized air and which can be connected to the outlet of the source of pressurized air via an inlet,
   a hose which is connected at a first end to an outlet of the container and which has a second end that can be connected to the tire, and
   a housing of the source of pressurized air comprising a base and an upper part disposed on a part of a top surface of the base,
   wherein the connection between the outlet of the source of pressurized air and the container can be established by means of a plug connection between the outlet of the source of pressurized air and the inlet of the container, the plug connection being plugged along a horizontal connection axis, and
   wherein a holder is disposed on a part of the top surface of the base on which the upper part is not provided and provided by which the container is supported outside the housing from below at a lower end.

18. An apparatus in accordance with claim 17, wherein the holder vertically supports the container at a vertically rounded lower end of the container, wherein the lower end is a tube socket defining the outlet of the container.

19. An apparatus in accordance with claim 17, wherein the holder is provided with a recess on a top surface thereof and positively locks the lower end of the container in the recess securely relative to the housing.

20. An apparatus in accordance with claim 17, wherein the holder at least partly consists of an elastic material or is displaceable against an elastic element.

21. An apparatus in accordance with claim 17, wherein the holder comprises rubber at least on its surface, which faces the lower end of the container.

22. An apparatus in accordance with claim 17, wherein the holder provides a snap-fit connection between the holder and the lower end of the container, such that the lower end of the container is arranged in a recess when the snap-fit connection is engaged and when the container is secured relative to the housing.

23. An apparatus in accordance with claim 17, wherein the holder comprises at least one protrusion to engage with the lower end of the container such that the protrusion is elastically displaced by the lower end of the container when the inlet of the container is plugged to the outlet of the source of pressurized air.

24. An apparatus in accordance with claim 17, wherein the holder is arranged in a depression depressed downward on a top side of a base defining a seat for the container together with an upper part of the housing.

25. An apparatus in accordance with claim 10, wherein a holder is provided on the seat by which the container is supported from below at a lower end.

\* \* \* \* \*